United States Patent
Song et al.

(10) Patent No.: US 10,978,251 B2
(45) Date of Patent: Apr. 13, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Seung Woo Song, Suwon-si (KR); Jin Man Jung, Suwon-si (KR); Sang Soo Park, Suwon-si (KR); Jin Kyung Joo, Suwon-Si (KR); Woo Chul Shin, Suwon-si (KR); Min Gon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 47 days.

(21) Appl. No.: 16/206,666

(22) Filed: Nov. 30, 2018

(65) Prior Publication Data
US 2020/0105476 A1    Apr. 2, 2020

(30) Foreign Application Priority Data

Oct. 2, 2018 (KR) .......................... 10-2018-0117770

(51) Int. Cl.
*H01G 4/30* (2006.01)
*H01G 4/232* (2006.01)
(Continued)

(52) U.S. Cl.
CPC .............. *H01G 4/30* (2013.01); *H01G 4/008* (2013.01); *H01G 4/1227* (2013.01); *H01G 4/232* (2013.01)

(58) Field of Classification Search
None
See application file for complete search history.

(56) References Cited

U.S. PATENT DOCUMENTS 10,026,558 B1 *   7/2018   Lee .......................... H01G 4/30
10,076,036 B2 *   9/2018   Lee ......................... H01G 4/012
(Continued)

FOREIGN PATENT DOCUMENTS

JP    2013-206898 A    7/2002
JP    2005-217126 A    8/2005
(Continued)

OTHER PUBLICATIONS

Korean Office Action dated Sep. 11, 2019 issued in Korean Patent Application No. 10-2018-0117770 (with English translation).

*Primary Examiner* — Dion Ferguson
(74) *Attorney, Agent, or Firm* — Morgan, Lewis & Bockius LLP

(57) ABSTRACT

A multilayer ceramic electronic component includes a multilayer ceramic electronic component including a ceramic body including a dielectric layer, and a first internal electrode and a second internal electrode facing each other with the dielectric layer interposed therebetween, and first and second external electrodes respectively electrically connected to the first and second internal electrodes, disposed in an outer portion of the ceramic body. The first and second external electrodes include a first electrode layer including a conductive metal, a first plating layer disposed on the first electrode layer and including nickel (Ni), and a second plating layer disposed on the first plating layer and including tin (Sn). A ratio (t1/t2) between a thickness (t1) of the first plating layer including nickel (Ni) and a thickness (t2) of the second plating layer including tin (Sn) is within a range from 1.0 to 9.0.

20 Claims, 2 Drawing Sheets

(51) Int. Cl.
   *H01G 4/008*    (2006.01)
   *H01G 4/12*     (2006.01)

(56)        References Cited

U.S. PATENT DOCUMENTS

| | | | |
|---|---|---|---|
| 10,361,035 B1* | 7/2019 | Song | .................... H01G 4/1227 |
| 10,784,047 B2* | 9/2020 | Song | ...................... H01G 4/236 |
| 2011/0290542 A1 | 12/2011 | Nishisaka et al. | |
| 2014/0041913 A1* | 2/2014 | Yanagida | ................. H05K 1/18 |
| | | | 174/260 |
| 2014/0185189 A1 | 7/2014 | Kim et al. | |
| 2015/0060121 A1* | 3/2015 | Lee | ........................ H05K 1/185 |
| | | | 174/258 |
| 2015/0124371 A1* | 5/2015 | Park | ....................... H01G 4/012 |
| | | | 361/301.4 |
| 2017/0018363 A1* | 1/2017 | Tanaka | ..................... H01G 4/30 |
| 2017/0256359 A1* | 9/2017 | Masunari | ............... H01G 4/232 |
| 2017/0294268 A1* | 10/2017 | Katsuta | .................. H01G 4/012 |
| 2018/0068793 A1 | 3/2018 | Lee et al. | |
| 2018/0068796 A1* | 3/2018 | Seo | ......................... H01G 4/232 |
| 2018/0342351 A1* | 11/2018 | Lee | .......................... H01G 4/30 |
| 2019/0066924 A1* | 2/2019 | Song | ...................... H01G 4/12 |
| 2019/0074138 A1* | 3/2019 | Song | ..................... H01G 4/012 |

FOREIGN PATENT DOCUMENTS

| | | | |
|---|---|---|---|
| JP | 2012-009813 A | 1/2012 | |
| JP | 2002-203734 A | 10/2013 | |
| KR | 10-2014-0085097 A | 7/2014 | |
| KR | 10-2018-0028276 A | 3/2018 | |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0117770 filed on Oct. 2, 2018 in the Korean Intellectual Property Office, the disclosure of which is incorporated herein by reference in its entirety.

TECHNICAL FIELD

The present disclosure relates to a multilayer ceramic electronic component, and more particularly, to a multilayer ceramic electronic component having high capacitance.

BACKGROUND

Recently, a substrate having high mounting density has been developed, and it has become necessary to reduce amounting area of a multilayer ceramic capacitor. There has been increased demand for products in which a multilayer ceramic capacitor having a thin thickness is embedded in a substrate or mounted in a lower end of an application processor (AP) as a land-side capacitor (LSC).

In this case, not only the mounting area may decrease, but equivalent series inductance (ESL) occurring in a substrate may also decrease. For this reason, a multilayer ceramic capacitor having a relatively thin thickness has increasingly been used.

A large amount of research has been conducted to develop a multilayer ceramic capacitor product in which a through-hole is formed in a ceramic body, electrodes are filled in the through-hole, and internal electrodes are connected.

In the case in which the process of forming a through-hole in a ceramic body is applied, the process of dipping a ceramic body to form an external electrode on an external surface may not be necessary. Thus, it may be possible to increase a size of a multilayer ceramic capacitor product by an amount equal to the reduction in thickness of an external electrode.

Also, the process of forming a through-hole in a ceramic body may be applied to a thin-film multilayer ceramic capacitor.

However, when the above process is used, an external electrode may be formed in both upper and lower portions of a ceramic body, but the external electrodes may not be connected to each other as the external electrodes may be disposed in the form of islands, which may lead to a conglomeration of tin (Sn) in a tin (Sn) plated layer disposed in outermost portions of the external electrodes during reflow.

Due to the conglomeration of tin (Sn), a thickness of an external electrode may increase. Thus, it has been necessary to resolve the issue of conglomeration of tin (Sn).

SUMMARY

An aspect of the present disclosure is to provide a multilayer ceramic electronic component, and more particularly to provide a multilayer ceramic electronic component having high capacitance.

According to an aspect of the present disclosure, a multilayer ceramic electronic component includes a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, and first external electrodes electrically connected to the first internal electrode, and second external electrodes electrically connected to the second internal electrode, disposed in an outer portion of the ceramic body. The first external electrodes are disposed on the first and second surfaces of the ceramic body, and are connected to each other through a first via penetrating through, and disposed in, the ceramic body. The second external electrodes are disposed on the first and second surfaces of the ceramic body, and are connected to each other through a second via penetrating through, and disposed in, the ceramic body. The first and second external electrodes include a first electrode layer including a conductive metal, a first plating layer disposed on the first electrode layer and including nickel (Ni), and a second plating layer disposed on the first plating layer and including tin (Sn). A ratio (t1/t2) between a thickness (t1) of the first plating layer including nickel (Ni) and a thickness (t2) of the second plating layer including tin (Sn) is within a range from 1.0 to 9.0.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
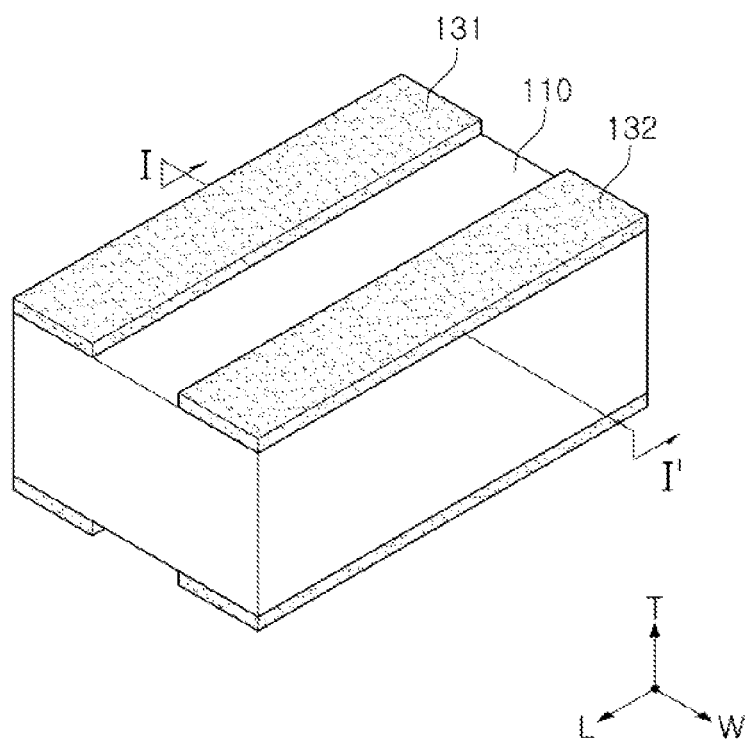
FIG. 1 is a perspective diagram illustrating a multilayer ceramic capacitor according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

Further, throughout the specification, it will be understood that when a portion "includes" an element, it can further include another element, not excluding another element, unless otherwise indicated.

In the drawings, certain elements may be omitted to clearly describe the present disclosure, and to clearly express a plurality of layers and areas, thicknesses may be magnified. The same elements having the same function within the scope of the same concept will be described with use of the same reference numeral.

FIG. 1 is a perspective diagram illustrating a multilayer ceramic capacitor according to an exemplary embodiment in the present disclosure.

Figure 2:
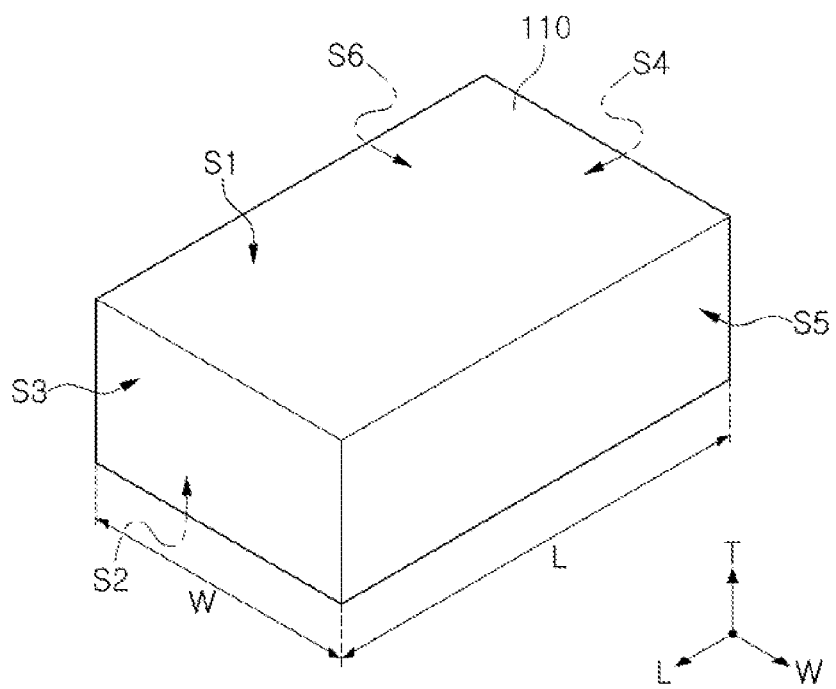
FIG. 2 is a diagram illustrating a ceramic body according to an exemplary embodiment in the present disclosure.

FIG. 2 is a diagram illustrating a ceramic body according to an exemplary embodiment in the present disclosure.

Figure 3:
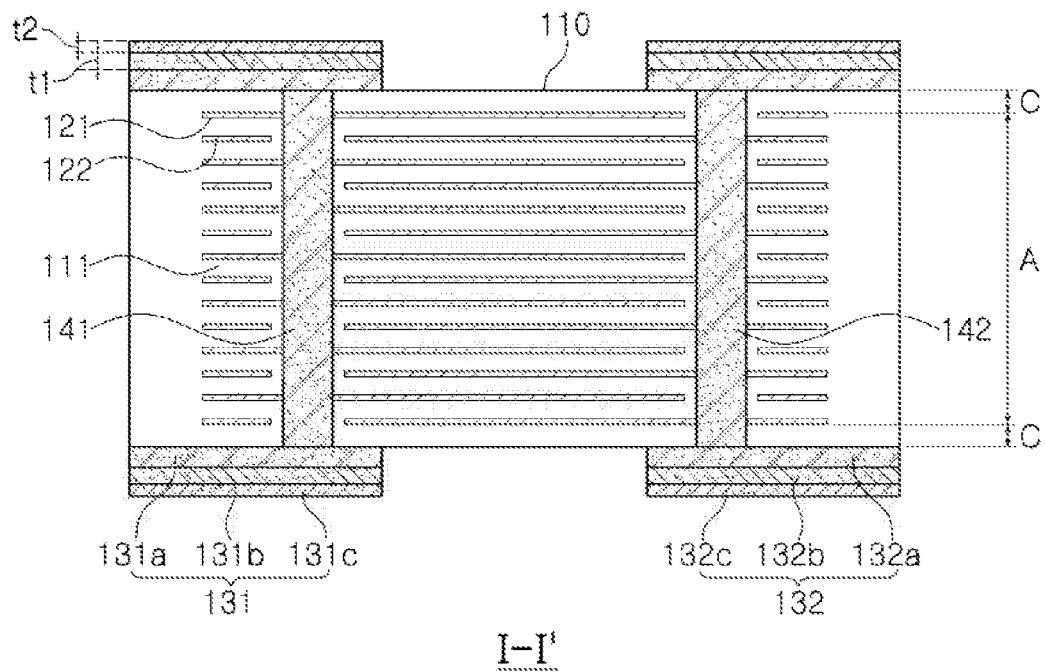
FIG. 3 is a cross-sectional diagram taken along line I-I' in a first exemplary embodiment.

FIG. 3 is a cross-sectional diagram taken along line I-I' in a first exemplary embodiment.

Referring to FIGS. 1 to 3, a multilayer ceramic electronic component according to an exemplary embodiment may include a ceramic body 110 including a dielectric layer 111, and a first internal electrode 121 and a second internal electrode 122 facing each other with the dielectric layer 111 interposed therebetween, and having first and second surfaces S1 and S2 opposing each other, third and fourth surfaces S3 and S4 connected to the first and second surfaces and opposing each other, and fifth and sixth surfaces S5 and S6 connected to the first to fourth surfaces S1 to S4 and opposing each other, and a first external electrode 131 electrically connected to the first internal electrode 121, and a second external electrode 132 electrically connected to the second internal electrode 122, disposed in an external portion of the ceramic body 110. The first external electrode 131 may be disposed on the first and second surfaces S1 and S2 of the ceramic body, and the first external electrodes 131 disposed on the first and second surfaces S1 and S2 may be connected to each other through a first via 141 penetrating through, and disposed in, the ceramic body 110. The second external electrode 132 may be disposed on the first and second surfaces S1 and S2 of the ceramic body 110, and the second external electrodes 132 disposed on the first and second surfaces S1 and S2 may be connected to each other through a second via 142 penetrating through, and disposed in, the ceramic body 110. Each first external electrode 131 may include a first electrode layer 131a including a conductive metal, a first plating layer 131b disposed on the first electrode layer 131a and including nickel (Ni), and a second plating layer 131c disposed on the first plating layer 131b and including tin (Sn). Each second external electrode 132 may include a first electrode layer 132a including a conductive metal, a first plating layer 132b disposed on the first electrode layer 132a and including nickel (Ni), and a second plating layer 132c disposed on the first plating layer 132b and including tin (Sn).

In the description below, a multilayer ceramic electronic component according to an exemplary embodiment will be described, particularly a multilayer ceramic capacitor, but a multilayer ceramic electronic component is not limited thereto.

As for the multilayer ceramic capacitor according to an exemplary embodiment, a length direction may be defined as an "L" direction, a width direction may be defined as a "W" direction, and a thickness direction may be defined as a "T" direction. The thickness direction may be the same as a layering direction, a direction in which dielectric layers are layered.

In the exemplary embodiment, the ceramic body 110 may not be limited to any particular shape. As illustrated, the ceramic body 110 may have a hexagonal shape, for example.

The ceramic body 110 may have first and second surfaces S1 and S2 opposing each other, third and fourth surfaces S3 and S4 connecting to the first and second surfaces and opposing each other, and fifth and sixth surfaces S5 and S6 connected to the first to fourth surfaces S1 to S4 and opposing each other.

The first and second surfaces S1 and S2 may face each other in a thickness direction of the ceramic body 110, the third and fourth surfaces S3 and S4 may face each other in a length direction, and the fifth and sixth surfaces S5 and S6 may face each other in a width direction.

The first internal electrode 121 and the second internal electrode 122 may be disposed in the ceramic body 110, and may not be exposed to a side surface of the ceramic body 110.

As for the internal electrodes 121 and 122, one of the first internal electrode 121 and one of the second internal electrode 122 having different polarities may be one pair.

The first internal electrode 121 may be disposed in the ceramic body 110, and may be electrically connected to the first via 141 penetrating through the ceramic body 110 and exposed to the first and second surfaces S1 and S2 of the ceramic body 110.

The second internal electrode 122 may be disposed in the ceramic body 110, and may be electrically connected to the second via 142 penetrating through the ceramic body 110 and exposed to the first and second surfaces S1 and S2 of the ceramic body 110.

The first and second external electrodes 131 and 132 may be disposed on the first and second surfaces S1 and S2 of the ceramic body 110. The first and second external electrodes 131 and 132 may be electrically connected to the first and second internal electrodes 121 and 122, respectively.

Specifically, the first internal electrode 121 may be electrically connected to the first external electrode 131 through the first via 141 exposed to the first and second surfaces S1 and S2 of the ceramic body 110.

The second internal electrode 122 may be electrically connected to the second external electrode 132 through the second via 142 exposed to the first and second surfaces S1 and S2 of the ceramic body 110.

According to the exemplary embodiment, a material of the dielectric layer 111 may not be limited to any particular material as long as sufficient capacitance can be obtained. For example, a material of the dielectric layer 111 may be a barium titanate ($BaTiO_3$) powder.

As the material of the dielectric layer 111, various ceramic additives, organic solvents, coupling agents, dispersing agents, and the like, may be added to a barium titanate ($BaTiO_3$) powder, or the like, depending on an intended purpose.

The ceramic body 110 may have an active portion A, a portion contributing to forming capacitance of the capacitor, and upper and lower cover portions C formed in upper and lower portions of the active portion A as upper and lower margin portions.

The active portion A may be formed by repeatedly layering a plurality of the first and second internal electrodes 121 and 122 with the dielectric layer 111 interposed therebetween.

The upper and lower cover portions C may have the same material and composition as those of the dielectric layer 111, but the upper and lower cover portions C may not include an internal electrode.

In other words, the upper and lower cover portions C may include a ceramic material, such as a barium titanate ($BaTiO_3$) ceramic material, for example.

The upper and lower cover portions C may be formed by disposing a single dielectric layer or layering two or more dielectric layers on upper and lower surfaces of the active portion A, and may prevent damage to an internal electrode caused by physical or chemical stress.

A material of the first and second internal electrodes 121 and 122 may not be limited to any particular material. The first and second internal electrodes 121 and 122 may be formed of a conductive paste including one or more of silver (Ag), lead (Pb), platinum (Pt), nickel (Ni), and copper (Cu).

The multilayer ceramic capacitor according to the exemplary embodiment may include the first external electrode 131 electrically connected to the first internal electrode 121 and the second external electrode 132 electrically connected to the second internal electrode 122.

The first and second external electrodes 131 and 132 may be electrically connected to the first and second internal electrodes 121 and 122 to form capacitance, and the second external electrode 132 may be connected to a potential different from a potential of the first external electrode 131.

The first and second internal electrodes 121 and 122 may be disposed to oppose each other with the dielectric layer 111 interposed therebetween, may be connected to the first and second vias 141 and 142 penetrating through the ceramic body 110, respectively, and connected to the first and second external electrodes 131 and 132, respectively.

As described above, as the first external electrode 131 and the second external electrode 132 are spaced apart from each other in a width direction on the first and second surfaces S1 and S2 of the ceramic body 110, a reverse geometry capacitor (RGC) or a low inductance chip capacitor (LICC) may be implemented.

In a general multilayer ceramic electronic component, an external electrode may be disposed on surfaces opposing each other in a length direction of a ceramic body.

In this case, when an alternating current (AC) is applied to the external electrode, a large current loop may be formed as a current path is longer, and an induced magnetic field may be increased, which may lead to an increase in inductance.

To address the issue above, according to the exemplary embodiment, the first and second external electrodes 131 and 132 may be disposed on the first and second surfaces S1 and S2 of the ceramic body 110 and spaced apart from each other to reduce a current path.

In this case, as a gap between the first and second external electrodes 131 and 132 is reduced, a current path may be reduced, and a current loop may also be reduced, which may reduce inductance.

The first external electrode 131 may be disposed on the first and second surfaces S1 and S2 of the ceramic body 110 in a thickness direction, and the first external electrode 131 disposed on the first surface S1 and the first external electrode 131 disposed on the second surface S2 may not be connected to each other in an outer portion of the ceramic body 110, and may thus be disposed in the form of islands. In the multilayer ceramic capacitor, the first external electrodes 131 disposed on the first and second surfaces S1 and S2 may oppose each other in the thickness direction and be spaced apart from each other.

The first external electrode 131 disposed on the first surface S1 and the first external electrode 131 disposed on the second surface S2 may be connected to the first via 141 penetrating through the ceramic body 110.

Similarly, the second external electrode 132 may be disposed on the first and second surfaces S1 and S2 of the ceramic body 110 in a thickness direction, and the second external electrode 132 disposed on the first surface S1 and the second external electrode 132 disposed on the second surface S2 may not be connected to each other in an outer portion of the ceramic body 110, and may thus be disposed in the form of islands. In the multilayer ceramic capacitor, the second external electrodes 132 disposed on the first and second surfaces S1 and S2 may oppose each other in the thickness direction and be spaced apart from each other.

The second external electrode 132 disposed on the first surface S1 and the second external electrode 132 disposed on the second surface S2 may be connected to the second via 142 penetrating through the ceramic body 110.

The first and second external electrodes 131 and 132 may be disposed on the first and second surfaces S1 and S2 of the ceramic body 110 in a length direction of the ceramic body 110, respectively, and spaced apart from each other, but an exemplary embodiment thereof is not limited thereto. For example, the first and second external electrodes 131 and 132 may be formed up to boundaries between the first and second surfaces S1 and S2 and the third and fourth surfaces S3 and S4.

Also, the first and second external electrodes 131 and 132 may be disposed on the first and second surfaces S1 and S2 of the ceramic body 110, respectively, and spaced apart from each other, and may face each other in a width direction.

As the first and second external electrodes 131 and 132 are disposed on the first and second surfaces S1 and S2 of the ceramic body 110, spaced apart from each other, and face each other in a width direction, a current path may be reduced, and a reverse geometry capacitor (RGC) or a low inductance chip capacitor (LICC) may be implemented, which may reduce an equivalent series inductance (ESL).

The first via 141 and the second via 142 may be formed by forming a hole in the ceramic body 110 and the first and second internal electrodes 121 and 122 and filling the holes with a conductive material. The conductive material may be applied by applying a conductive paste, by a plating process, or the like. In this case, the hole in the ceramic body 110 may be formed through a laser process or a punching process on a ceramic green sheet, or may be obtained by forming a hole on a layering body after a sintering process.

The conductive material may not be limited to any particular material. The material may include, for example, one or more conductive metals selected from a group comprised of copper (Cu), silver (Ag), nickel (Ni), and alloys thereof.

In the multilayer ceramic capacitor according to the exemplary embodiment, the first and second internal electrodes 121 and 122 may be connected to the first and second external electrodes 131 and 132 through the first via 141 and the second via 142, respectively, and thus, an area of overlap between the first internal electrode 121 and the second internal electrode 122 may be significantly increased.

Accordingly, without applying the method of increasing the number of an internal electrode layer by reducing thicknesses of a dielectric layer and an internal electrode, and the like, it may be possible to increase capacitance of a capacitor.

Also, as the same type of internal electrodes are electrically connected to each other through the first via 141 and the second via 142, even when a thickness of a multilayer ceramic capacitor is significantly low, a thickness of 110 µm or less, for example, connectivity of internal electrodes may be improved.

The first via 141 may be connected to the first internal electrode 121, and may be insulated from the second internal electrode 122. The second via 142 may be connected to the second internal electrode 122, and may be insulated from the first internal electrode 121.

The first external electrode 131 disposed on the first and second surfaces S1 and S2 of the ceramic body 110 may be connected through the first via 141 disposed in and penetrating through the ceramic body 110, and as the first via 141 is connected to the first internal electrode 121, and insulated from the second internal electrode 122, the first external electrode 131 may be electrically connected to the first internal electrode 121.

The second internal electrodes 122 disposed on the first and second surfaces S1 and S2 of the ceramic body 110 may be connected to each other through the second via 142 disposed in and penetrating through the ceramic body 110, and as the second via 142 is connected to the second internal electrode 122 and insulated from the first internal electrode 121, the second external electrode 132 may be electrically connected to the second internal electrode 122.

According to the exemplary embodiment, the first and second external electrodes 131 and 132 may include first electrode layers 131a and 132a disposed on an outer portion of the ceramic body 110 and including a conductive metal, first plating layers 131b and 132b disposed on the first electrode layers 131a and 132a and including nickel (Ni), and second plating layers 131c and 132c disposed on the first plating layers 131b and 132b and including tin (Sn).

Referring to FIG. 3, the plating layers may have two layers, and may include the first plating layers 131b and 132b including nickel (Ni) and the second plating layers 131c and 132c disposed on the first plating layers 131b and 132b and including tin (Sn). However, an exemplary embodiment thereof is not limited thereto.

The first electrode layers 131a and 132a may include a conductive metal and glass.

To form capacitance, the first and second external electrodes 131 and 132 may be formed in a width direction on first and second surfaces S1 and S2 of the ceramic body 110, and the first electrode layers 131a and 132a included in the first and second external electrodes 131 and 132 may be electrically connected to the first and second internal electrodes 121 and 122, respectively.

More particularly, as the first electrode layers 131a and 132a are connected to the first via 141 and the second via 142, respectively, the first electrode layers 131a and 132a may be electrically connected to the first and second internal electrodes 121 and 122, respectively.

The first electrode layers 131a and 132a may be formed of the same conductive material as a material of the first and second internal electrodes 121 and 122, but a material of the first electrode layers 131a and 132a is not limited thereto. The material of the first electrode layers 131a and 132a may include one or more conductive metals selected from a group comprised of copper (Cu), silver (Ag), nickel (Ni), and alloys thereof, for example.

According to the exemplary embodiment, the first electrode layers 131a and 132a may include nickel (Ni) as the conductive metal.

The first electrode layers 131a and 132a may be formed by applying a conductive paste made by adding glass frit to a powder of the conductive metal, and performing a sintering process.

In other words, the first electrode layers 131a and 132a may be a sintered electrode layer including a conductive metal and glass.

According to the exemplary embodiment, the first and second external electrodes 131 and 132 may include the first plating layers 131b and 132b disposed on the first electrode layers 131a and 132a and including nickel (Ni), and the second plating layers 131c and 132c disposed on the first plating layers 131b and 132b and including tin (Sn).

As in the exemplary embodiment, when the external electrodes are disposed on upper and lower portions of the ceramic body, but the external electrodes are not connected to each other and disposed in the form of islands, tin (Sn) may conglomerate on a tin (Sn) plated layer disposed in an outermost portion of the external electrode during reflow.

If the conglomeration of tin (Sn) occurs, a thickness of the external electrode may be increased, and a size of a multilayer ceramic capacitor may also be increased. As a result, it may be difficult to implement a multilayer ceramic capacitor having high capacitance.

To address the issue above, according to the exemplary embodiment, a ratio t1/t2 between a thickness t2 of the second plating layer 131c and 132c including tin (Sn) and a thickness t1 of the first plating layer 131b and 132b including nickel (Ni) may be adjusted to be within a range from 1.0 to 9.0. Accordingly, the conglomeration of tin (Sn) may be prevented in a multilayer ceramic capacitor having a significantly low thickness, a thickness of 110 μm or less, for example, and a multilayer ceramic capacitor having high capacitance may thus be implemented.

In other words, according to the exemplary embodiment, by forming a thickness of the first plating layers 131b and 132b including nickel (Ni) to be greater than a thickness of the second plating layers 131c and 132c including tin (Sn), the conglomeration of tin (Sn) may be prevented, and an overall thickness of the external electrode may be controlled. Accordingly, a multilayer ceramic capacitor with a significantly low thickness, a thickness of 110 μm or less, for example, and having high capacitance may be implemented.

According to the exemplary embodiment, the multilayer ceramic capacitor may have a thickness of 110 μm or less.

As, in the exemplary embodiment, when the external electrodes are disposed on upper and lower portions of the ceramic body, respectively, and the external electrodes are not connected to each other and disposed in the form of islands, the greater the thickness of a tin (Sn) plated layer connected to a solder, the higher the likelihood of conglomeration of tin (Sn) during a soldering process or reflow.

As described above, as a thickness of the external electrode increases due to the conglomeration of tin (Sn) caused by an increase in thickness of the tin (Sn) plated layer, an area occupied by the external electrode may also be increased, and it may be difficult to implement a multilayer ceramic capacitor having high capacitance.

According to the exemplary embodiment, to implement a multilayer ceramic capacitor having a thin thickness, a thickness of 110 μm or less, for example, and having high capacitance, a desirable ratio between thicknesses of the first plating layers 131b and 132b and the second plating layers 131c and 132c may be derived within a limited thickness of the plating layers.

According to the exemplary embodiment, in a multilayer ceramic capacitor having a significantly low thickness, a thickness of 110 μm or less, for example, a ratio t1/t2 between a thickness t2 of the second plating layer 131c and 132c including tin (Sn) and a thickness t1 of the first plating layer 131b and 132b including nickel (Ni) may be determined. In in the case of a multilayer ceramic capacitor having a thickness greater than 110 μm in the prior arts, and a general multilayer ceramic capacitor in which an external electrode is disposed on both side surfaces of a ceramic body in a length direction, rather than being disposed in the form of islands, the conglomeration of tin (Sn) may not occur in a tin (Sn) plated layer, or there may be no difficulty in implementing a multilayer ceramic capacitor having high capacitance.

Thus, it may not be necessary to apply the configuration suggested in the exemplary embodiment in a multilayer ceramic capacitor disclosed in the prior arts.

When a ratio (t1/t2) between a thickness t1 of the first plating layer 131b and 132b including nickel (Ni) and a thickness t2 of the second plating layer 131c and 132c including tin (Sn) is less than 1.0, the conglomeration of tin (Sn) may occur, and a thickness of the external electrode may be increased.

When a ratio (t1/t2) between a thickness t1 of the first plating layer 131b and 132b including nickel (Ni) and a thickness t2 of the second plating layer 131c and 132c including tin (Sn) is greater than 9.0, a ratio between a thickness of the ceramic body 110 and a thickness of a portion occupied by the external electrodes may be significantly increased, and it may be impossible to implement a multilayer ceramic capacitor having high capacitance.

According to the exemplary embodiment, the sum of a thickness of the second plating layer 131c and a thickness of the first plating layer 131b may be 10 μm or less and the sum of a thickness of the second plating layer 132c and a thickness of the first plating layer 132b may be 10 μm or less.

According to the exemplary embodiment, to increase strength against breakage of a multilayer ceramic capacitor having a thin thickness, a thickness of 110 μm or less, for example, and to implement a multilayer ceramic capacitor having high capacitance, a ratio (t1/t2) between a thickness t1 of the first plating layer 131b and 132b including nickel (Ni) and a thickness t2 of the second plating layer 131c and 132c including tin (Sn) may be within a range from 1.0 to 9.0, and the sum of a thickness of the second plating layer 131c and a thickness of the first plating layer 131b may be 10 μm or less and the sum of a thickness of the second plating layer 132c and a thickness of the first plating layer 132b may be 10 μm or less.

If the sum of a thickness of the second plating layer 131c and a thickness of the first plating layer 131b exceeds 10 μm or less and the sum of a thickness of the second plating layer 132c and a thickness of the first plating layer 132b exceeds 10 μm or less, a ratio between a thickness of the ceramic body 110 and a thickness of a portion occupied by the external electrodes may be significantly increased, and a multilayer ceramic capacitor having high capacitance may not be implemented.

A thickness t2 of the second plating layer 131c and 132c may be 0.5 μm or greater, and a maximum value of the thickness t2 is not particularly limited. However, to prevent the conglomeration of tin (Sn), a thickness t2 of the second plating layer 131c and 132c may be 0.5 μm or less.

According to the exemplary embodiment, the first and second external electrodes 131 and 132 disposed on the first and second surfaces S1 and S2 of the ceramic body 110 may occupy areas 50% or greater of the first and second surfaces S1 and S2 of the ceramic body 110, respectively.

Figure 4:
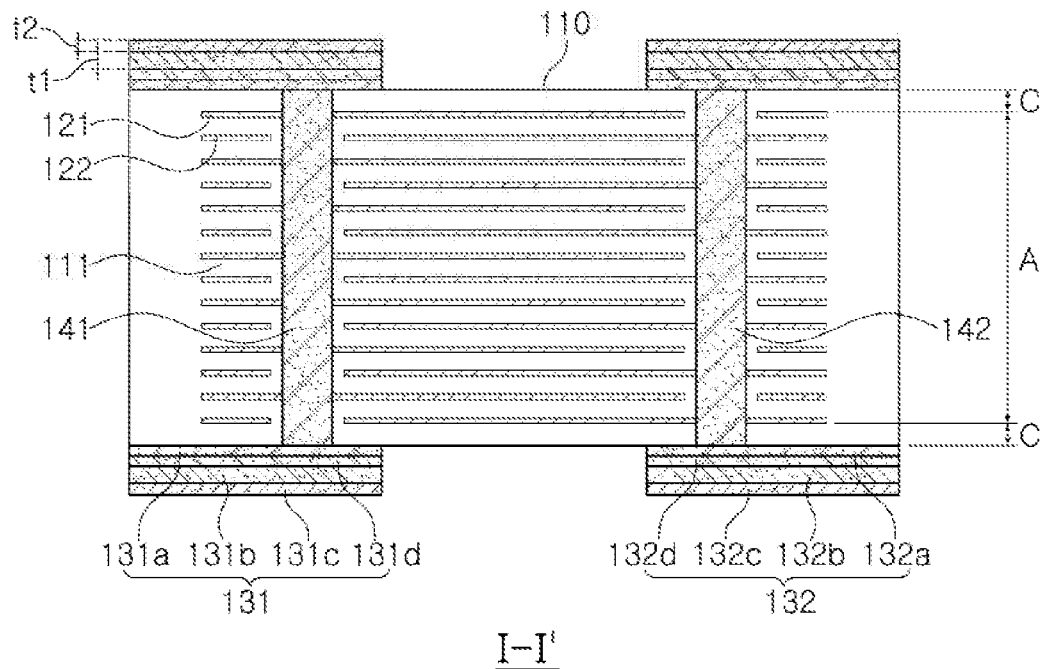
FIG. 4 is a cross-sectional diagram taken along line I-I' in a second exemplary embodiment.

FIG. 4 is a cross-sectional diagram taken along line I-I' in a second exemplary embodiment.

As described above, the plating layers may have two layers, and the plating layers may include the first plating layers 131b and 132b and the second plating layers 131c and 132c, respectively.

Referring to FIG. 4, in a multilayer ceramic capacitor according to the exemplary embodiment, a third plating layer 131d and 132d including copper (Cu) may be further disposed between the first electrode layer 131a and 132a and the first plating layers 131b and 132b disposed on the first electrode layers 131a and 132a in the first and second external electrodes 131 and 132.

In the description below, a method of manufacturing of a multilayer ceramic capacitor will be described in accordance with an exemplary embodiment. The method, however, is not limited thereto.

As for the method of manufacturing a multilayer ceramic capacitor according to the exemplary embodiment, a slurry formed including a powder such as barium titanate ($BaTiO_3$), and the like, may be applied on a carrier film and dried to form a plurality of ceramic green sheets, and a dielectric layer may be formed using the ceramic green sheets.

The ceramic green sheet may be a sheet having a certain thickness (μm), which may be manufactured using slurry formed of a mixture of a ceramic powder, a binder, and a solvent, and by performing a doctor blade process on the slurry.

Then, a conductive paste for an internal electrode, having an average size of a nickel particle between 0.1 and 0.2 μm and including a nickel powder within a range from 40 to 50 part by weight, may be prepared.

An internal electrode may be formed by applying the conductive paste for an internal electrode on the green sheet using a printing process, the green sheets on which an internal electrode pattern is disposed may be layered, and the ceramic body 110 may be formed.

Thereafter, a hole may be formed in the ceramic body 110 and the internal electrode, the hole may be filled with a conductive material, and the first and second vias 141 and 142 may be formed.

The conductive material filled to form the first and second vias 141 and 142 may be applied by applying a conductive paste or through a plating process.

In this case, the hole in the ceramic body 110 may be formed by performing a laser process or a punching process on the ceramic green sheet, or may be obtained by forming a hole on a layering body after a sintering process.

The conductive material may not be particularly limited. The conductive material may include, for example, one or more conductive metals selected from a group comprised of copper (Cu), silver (Ag), nickel (Ni), and alloys thereof.

Then, the first electrode layer including a conductive metal and glass may be formed on an outer portion of the ceramic body 110.

The conductive material may not be particularly limited. The conductive material may be, for example, one or more conductive metals selected from a group comprised of copper (Cu), silver (Ag), nickel (Ni), and alloys thereof.

In the exemplary embodiment, the first electrode layer may be formed using nickel (Ni) as the conductive metal.

The glass may not be particularly limited. The glass may have the same composition as that of the glass used for manufacturing an external electrode of a general multilayer ceramic capacitor.

The first electrode layer may be formed on upper and lower surfaces of the ceramic body 110, and the first electrode layers may be connected to the first and second internal electrodes 121 and 122.

The first electrode layer may include 5% or higher of glass in volume, as compared to a first conductive metal.

Then, the first plating layer including nickel (Ni) may be formed on the first electrode layer.

Thereafter, the second electrode layer including tin (Sn) may be formed on the first plating layer.

Table 1 below shows a presence of conglomeration of tin (Sn) in accordance with a ratio between thicknesses of the first plating layer and the second plating layer included in the external electrode.

A sample in which the conglomeration of tin (Sn) occurred was marked "X," and the sample was selected as a comparative example. A sample in which the conglomeration of tin (Sn) did not occur was marked "0," and the sample was selected as an inventive example.

TABLE 1

| Sample | Thickness of first plating layer including nickel (Ni) [μm] | Thickness of second plating layer including tin (Sn) [μm] | Ration between thicknesses of first and second plating layers | Presence of conglomeration of tin (Sn) |
|---|---|---|---|---|
| *1 | 1 | 9 | 0.11 | x |
| *2 | 2 | 8 | 0.25 | x |
| *3 | 3 | 7 | 0.42 | x |
| *4 | 4 | 6 | 0.66 | x |
| 5 | 5 | 5 | 1.00 | o |
| 6 | 6 | 4 | 1.50 | o |
| 7 | 7 | 3 | 2.33 | o |
| 8 | 8 | 2 | 4.00 | o |
| 9 | 9 | 1 | 9.00 | o |
| *10 | 10 | 1 | 10.00 | — |

*Comparative example

In Table 1 above, in samples 1 to 4, a ratio (t1/t2) between a thickness t1 of the first plating layer 131b and 132b including nickel (Ni) and a thickness t2 of the second plating layer 131c and 132c including tin (Sn) was less than 1.0, and the conglomeration of tin (Sn) occurred. As a result, a thickness of the external electrode may have been increased.

However, in samples 5 to 9, a ratio (t1/t2) between a thickness t1 of the first plating layer 131b and 132b including nickel (Ni) and a thickness t2 of the second plating layer 131c and 132c including tin (Sn) was within a range from 1.0 to 9.0, which are exemplary embodiments, and the conglomeration of tin (Sn) did not occur in a multilayer ceramic capacitor having a thin thickness, a thickness of 110 μm or less. Accordingly, a multilayer ceramic capacitor having high capacitance may be implemented.

Also, in sample 10, a ratio (t1/t2) between a thickness t1 of the first plating layer 131b and 132b including nickel (Ni) and a thickness t2 of the second plating layer 131c and 132c including tin (Sn) was greater than 9.0. In this case, a ratio between a thickness of the ceramic body 110 and a thickness of the external electrode was significantly high, and it may not be possible to implement a multilayer ceramic capacitor having high capacitance.

According to the aforementioned exemplary embodiments, by adjusting a ratio between a thickness of the second plating layer including tin (Sn) and a thickness of the first plating layer including nickel (Ni), the conglomeration of tin (Sn) may be prevented in the second plating layer including tin (Sn) disposed in an outermost portion in the external electrode, and a multilayer ceramic capacitor having high capacitance may be implemented.

While the exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
first external electrodes connected to the first internal electrode, and second external electrodes connected to the second internal electrode, disposed in an outer portion of the ceramic body,
wherein the first external electrodes are disposed on the first and second surfaces of the ceramic body, and are connected to each other through a first via penetrating through, and disposed in, the ceramic body,
wherein the second external electrodes are disposed on the first and second surfaces of the ceramic body, and are connected to each other through a second via penetrating through, and disposed in, the ceramic body,
wherein the first and second external electrodes comprise a first electrode layer including a conductive metal, a first plating layer disposed on the first electrode layer and including nickel (Ni), and a second plating layer disposed on the first plating layer and including tin (Sn),
wherein a ratio (t1/t2) between a thickness (t1) of the first plating layer including nickel (Ni) and a thickness (t2) of the second plating layer including tin (Sn) is within a range from 1.0 to 9.0,
wherein the multilayer ceramic electronic component has a thickness of 110 μm or less,
wherein each of the first and second external electrodes extends in a length direction of the ceramic body, respectively,
wherein the first and second external electrodes are spaced apart from each other in a width direction of the ceramic body, and
wherein each of the first and second external electrodes disposed on the first surface extends from a boundary between the first surface and the third surface and from a boundary between the first surface and the fourth surface, and each of the first and second external electrodes disposed on the second surface extends from a boundary between the second surface and the third surface and from a boundary between the second surface and the fourth surface.

2. The multilayer ceramic electronic component of claim 1, wherein a sum of the thicknesses (t1 and t2) of the first plating layer and the second plating layer is 10 μm or less.

3. The multilayer ceramic electronic component of claim 1, wherein the thickness (t2) of the second plating layer is 0.5 μm or greater.

4. The multilayer ceramic electronic component of claim 1, wherein the first electrode layer is a sintered electrode layer including one or more conductive metals selected from a group comprised of copper (Cu), silver (Ag), nickel (Ni), and alloys thereof, and glass.

5. The multilayer ceramic electronic component of claim 4, wherein the conductive metal included in the first electrode layer is nickel (Ni).

6. The multilayer ceramic electronic component of claim 1, further comprising:
a third plating layer including copper (Cu) between the first electrode layer and the first plating layer disposed on the first electrode layer.

7. The multilayer ceramic electronic component of claim 1, wherein a length of the ceramic body is a distance between the third and fourth surfaces, and a width of the ceramic body is a distance between the fifth and sixth surfaces.

8. The multilayer ceramic electronic component of claim 1, wherein the first via is connected to the first internal electrode and is insulated from the second internal electrode, and the second via is connected to the second internal electrode and is insulated from the first internal electrode.

9. The multilayer ceramic electronic component of claim 1, wherein the first and second external electrodes disposed on the first and second surfaces of the ceramic body occupy areas 50% or greater of the first and second surfaces of the ceramic body, respectively.

10. A multilayer ceramic electronic component comprising:
a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
first external electrodes connected to the first internal electrode, and second external electrodes connected to the second internal electrode, disposed in an outer portion of the ceramic body,
wherein the first external electrodes are disposed on the first and second surfaces of the ceramic body, and are connected to each other through a first via penetrating through, and disposed in, the ceramic body,
wherein the second external electrodes are disposed on the first and second surfaces of the ceramic body, and are connected to each other through a second via penetrating through, and disposed in, the ceramic body,
wherein the first and second external electrodes comprise a first electrode layer including a conductive metal, a first plating layer disposed on the first electrode layer and including nickel (Ni), and a second plating layer disposed on the first plating layer and including tin (Sn),
wherein a ratio (t1/t2) between a thickness (t1) of the first plating layer including nickel (Ni) and a thickness (t2) of the second plating layer including tin (Sn) is within a range from 1.0 to 9.0, and
wherein the thickness (t1) is equal to or greater than 5 μm,
wherein each of the first and second external electrodes extends in a length direction of the ceramic body, respectively,
wherein the first and second external electrodes are spaced apart from each other in a width direction of the ceramic body, and
wherein each of the first and second external electrodes disposed on the first surface extends from a boundary between the first surface and the third surface and from a boundary between the first surface and the fourth surface, and each of the first and second external electrodes disposed on the second surface extends from a boundary between the second surface and the third surface and from a boundary between the second surface and the fourth surface.

11. The multilayer ceramic electronic component of claim 10, wherein a sum of the thicknesses (t1 and t2) of the first plating layer and the second plating layer is 10 μm or less.

12. The multilayer ceramic electronic component of claim 10, wherein the thickness (t2) of the second plating layer is 0.5 μm or greater.

13. The multilayer ceramic electronic component of claim 10, wherein the first electrode layer is a sintered electrode layer including one or more conductive metals selected from a group comprised of copper (Cu), silver (Ag), nickel (Ni), and alloys thereof, and glass.

14. The multilayer ceramic electronic component of claim 13, wherein the conductive metal included in the first electrode layer is nickel (Ni).

15. The multilayer ceramic electronic component of claim 10, further comprising:
a third plating layer including copper (Cu) between the first electrode layer and the first plating layer disposed on the first electrode layer.

16. The multilayer ceramic electronic component of claim 10, wherein the first via is connected to the first internal electrode and is insulated from the second internal electrode, and the second via is connected to the second internal electrode and is insulated from the first internal electrode.

17. The multilayer ceramic electronic component of claim 10, wherein the first and second external electrodes disposed on the first and second surfaces of the ceramic body occupy areas 50% or greater of the first and second surfaces of the ceramic body, respectively.

18. The multilayer ceramic electronic component of claim 10, wherein the thickness (t1) is equal to or less than 9 μm.

19. A multilayer ceramic electronic component comprising:
a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and
first external electrodes connected to the first internal electrode, and second external electrodes connected to the second internal electrode,
wherein the first external electrodes are connected to each other through a first via penetrating through, and disposed in, the ceramic body,
wherein the second external electrodes are connected to each other through a second via penetrating through, and disposed in, the ceramic body,
wherein the first and second external electrodes comprise a first electrode layer including a conductive metal, a first plating layer disposed on the first electrode layer and including nickel (Ni), and a second plating layer disposed on the first plating layer and including tin (Sn),
wherein a ratio (t1/t2) between a thickness (t1) of the first plating layer including nickel (Ni) and a thickness (t2) of the second plating layer including tin (Sn) is within a range from 1.0 to 9.0,
wherein each of the first and second external electrodes disposed on the first surface extends from a boundary between the first surface and the third surface to a boundary between the first surface and the fourth surface, and each of the first and second external electrodes disposed on the second surface extends from a boundary between the second surface and the third surface to a boundary between the second surface and the fourth surface,
wherein among the first to sixth surfaces, the first external electrodes are disposed only on the first and second surfaces, and
wherein among the first to sixth surfaces, the second external electrodes are disposed only on the first and second surfaces.

20. The multilayer ceramic electronic component of claim 19, wherein a sum of the thicknesses (t1 and t2) of the first plating layer and the second plating layer is 10 μm or less.

* * * * *